United States Patent
Langan (10) Patent No.: US 6,676,714 B2
(45) Date of Patent: Jan. 13, 2004

(54) APPARATUS AND METHOD FOR ASSEMBLING A FLEXIBLE BATTERY THAT IS ELECTROLYTE-TIGHT

(75) Inventor: Richard A. Langan, Parma, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/779,247

(22) Filed: Feb. 8, 2001

(65) Prior Publication Data

US 2002/0106555 A1 Aug. 8, 2002

(51) Int. Cl.[7] ............................................. H01M 10/04
(52) U.S. Cl. ...................... 29/623.1; 29/623.2; 29/730
(58) Field of Search ............................. 29/623.1, 623.2, 29/730

(56) References Cited

U.S. PATENT DOCUMENTS

| | | | | |
|---|---|---|---|---|
| 4,092,464 A | * | 5/1978 | Dey et al. | 429/127 |
| 5,212,867 A | * | 5/1993 | Vogel | 29/623.1 |
| 5,690,703 A | * | 11/1997 | Mitchell et al. | 9/730 X |
| 5,746,781 A | * | 5/1998 | Velasquez et al. | 29/730 |
| 5,759,215 A | * | 6/1998 | Masuda | 29/623.2 |
| 6,371,996 B1 | * | 4/2002 | Takayama et al. | 29/623.2 |

FOREIGN PATENT DOCUMENTS

| | | | |
|---|---|---|---|
| EP | 0 862 230 | 9/1998 | ............ H01M/2/34 |
| EP | 1 045 463 | 10/2000 | ............ H01M/2/36 |
| EP | 1 061 601 | 12/2000 | ............ H01M/10/40 |
| JP | 59-198654 | 11/1984 | ............ H01M/2/02 |
| JP | 09129203 | 5/1997 | ............ H01M/2/06 |
| JP | 2000277065 | 10/2000 | ............ H01M/2/08 |

\* cited by examiner

Primary Examiner—Stephen Kalafut
(74) Attorney, Agent, or Firm—Michael C. Pophal (57) ABSTRACT

The invention provides for an apparatus and method for making a flexible battery that is electrolyte-tight by ensuring that electrolyte does not contact the unsealed portion of the battery enclosure when electrolyte is injected into the battery enclosure and before it is sealed. The apparatus for assembling a flexible battery comprises a support body adapted to support a battery enclosure having an electrode pouch and a fill opening located in an upper portion of the electrode pouch. The apparatus comprises a dispensing element having a discharge orifice that directs the flow of electrolyte inside the electrode pouch and away from the unsealed surfaces of the battery enclosure when the dispensing element is in the fill position. The method of assembling a pouch battery comprises arranging the battery enclosure so that the fill opening is located in an upper portion of the electrode pouch and dispensing the electrolyte into the electrode pouch.

20 Claims, 7 Drawing Sheets

APPARATUS AND METHOD FOR ASSEMBLING A FLEXIBLE BATTERY THAT IS ELECTROLYTE-TIGHT

FIELD OF THE INVENTION

This invention relates to an apparatus and a method for making a battery. More specifically, this invention relates to an apparatus and method for assembling a flexible battery and the resulting flexible battery.

BACKGROUND OF THE INVENTION

Flexible batteries, which have an enclosure made of a flexible laminate, can be made thin and light in weight, and are capable of conforming to different size and shaped compartments of devices in which they are used. Thus flexible batteries find advantageous use in many consumer electronic devices, such as cellular telephones and camcorders, for example.

Components of a flexible battery, in general, include an anode, a cathode, separator material and electrolyte which are contained within a flexible battery enclosure. The combination of anode, cathode and separator material is known as the electrode assembly. The electrolyte is the medium that serves as the pathway for ionic conduction between the anode and cathode. Liquid electrolyte can include aqueous solutions, for example, sodium hydroxide and potassium hydroxide, or non-aqueous solutions of organic solvents that contain dissolved inorganic salts.

The battery enclosure of a flexible battery is typically made of one or more flexible sheets joined together to produce a laminate. One type of laminate, for example, comprises a metallic foil layer that prevents electrolyte vapor from escaping the battery and also prevents the ingress of external gases. The laminate may also comprise an outer polymer layer that protects the integrity of the metallic foil, and an inner polymer layer that provides a sealing surface for joining the sheets together. Adhesives or tie layers, which bond the individual layers to one another, may also be present.

A flexible battery can be made by placing an electrode assembly between the multi-layered laminates that make up the battery enclosure, and then joining the laminates about the perimeter of the battery enclosure. A portion of the perimeter sealing surfaces is left open so that liquid electrolyte can be dispensed into the battery enclosure and around the electrode assembly. After the electrolyte is added, the opening is sealed.

A sealed battery assembly may incorporate one or more distinct pouches. Where the sealed battery assembly has two pouches, for example, one pouch, the electrode pouch, secures the electrode assembly and a second pouch, the gas pouch, serves as a reservoir for collecting any gas that may be formed or generated by the electrode assembly. Gas may be generated by the electrode assembly during aging, storage, pre-discharge, formation cycling, shipping, handling or combinations thereof. A connecting channel in the battery enclosure connects the two pouches and permits the free flow of gases between them. The opening between the electrode pouch and the gas pouch of the sealed battery assembly can be sealed and the gas pouch can be cut away and discarded, thereby producing a flexible battery.

A problem with flexible batteries, however, is that the sealed surfaces of the battery enclosure can leak. This is due in part to the presence of electrolyte on the sealing surfaces prior to sealing the battery enclosure.

It is desired, therefore, to provide an apparatus and method that minimizes the potential for electrolyte to contact the sealing surfaces of the battery enclosure. It is desired to provide an apparatus and method for producing a flexible battery that is hermetically sealed and fluid-tight.

SUMMARY OF THE INVENTION

The present invention is based on recognition and discovery that the problem of electrolyte leakage in a flexible battery can be due in part to the contamination of sealed surfaces by electrolyte prior to sealing the battery enclosure during assembly. The invention, therefore, provides for an apparatus and method for making flexible batteries which reduces or eliminates electrolyte contact on these sealed surfaces when electrolyte is introduced into the battery enclosure.

The present invention provides an apparatus for assembling an electrolyte-tight pouch battery which comprises a support body adapted to support a flexible battery enclosure having an electrode pouch such that the fill opening is located in an upper portion of the electrode pouch for receiving electrolyte. The apparatus also comprises a dispensing element having a discharge orifice that directs the flow of electrolyte inside the electrode pouch when the dispensing element is in the fill position. The discharge orifice directs the flow of electrolyte away from the open portions of the battery enclosure that are subsequently sealed. The fill opening is located in an upper portion of the electrode pouch that is above a predetermined free electrolyte fill level for electrolyte that may accumulate inside the electrode pouch during the filing process.

In one embodiment of the invention, the electrode pouch is oriented prior to filling such that its walls are positioned vertically, or nearly vertically. In this manner gravity aids the filling process and directs the electrolyte away from the sealing surfaces that will be joined together after filling.

In another aspect of the invention, the support body of the apparatus herein supports the battery enclosure during filling in a manner that minimizes the unbounded surface area of electrolyte that is collected in the electrode pouch. Minimization of this unbounded surface of electrolyte reduces the potential for electrolyte to splash, spill or otherwise contaminate the sealing surfaces surrounding openings required for electrolyte filling. With this approach, such openings can be reliably and consistently sealed without exhibiting leakage.

In addition, the present invention provides a method for assembling a fluid-tight flexible battery by arranging the electrode pouch of the battery enclosure such that the fill opening of the electrode pouch is oriented in an upper portion of the electrode pouch, and then dispensing electrolyte from a dispensing element into the electrode pouch. The electrolyte is dispensed away from the sealing surfaces of the enclosure that surround the fill opening to avoid contamination. After filling, the fill opening is sealed to produce a leak-tight flexible battery.

In another aspect of the present invention, the anode tab and the cathode tab that extend from the interior of the battery enclosure to the external area of the battery enclosure do not extend through the fill opening. The portion of the battery enclosure surrounding the anode tab and the cathode tab are sealed prior to the introduction of electrolyte into the battery enclosure to further minimize leakage of electrolyte into the battery enclosure.

These and other aspects and advantages of the present invention will be apparent to those skilled in the art from the following description of the preferred embodiments in view of the accompanying drawings.

BRIEF DESCRIPTION OF THE DRAWINGS

The invention may take physical form in certain parts and arrangements of parts, and a method of which will be described in detail in this specification and illustrated in the accompanying drawings which form a part hereof, and wherein.

DETAILED DESCRIPTION OF THE INVENTION

A flexible battery, according to the present invention, is made by first producing a flexible battery enclosure that contains an electrode assembly, then introducing electrolyte into the battery enclosure, and finally, sealing the battery enclosure to produce an electrolyte-tight flexible battery. The invention herein is based on discovery that the problem of electrolyte leakage of a flexible battery can be due to the contamination by electrolyte of surfaces of the battery enclosure which are open when electrolyte is dispensed and which are later sealed. The contamination by the electrolyte makes it difficult or impossible to obtain an adequate seal. Accordingly, the present invention provides for an apparatus and method for assembling a sealed, flexible battery that minimizes the potential for electrolyte to contaminate sealing surfaces furing the introduction of electrolyte into the battery enclosure.

Figure 1:
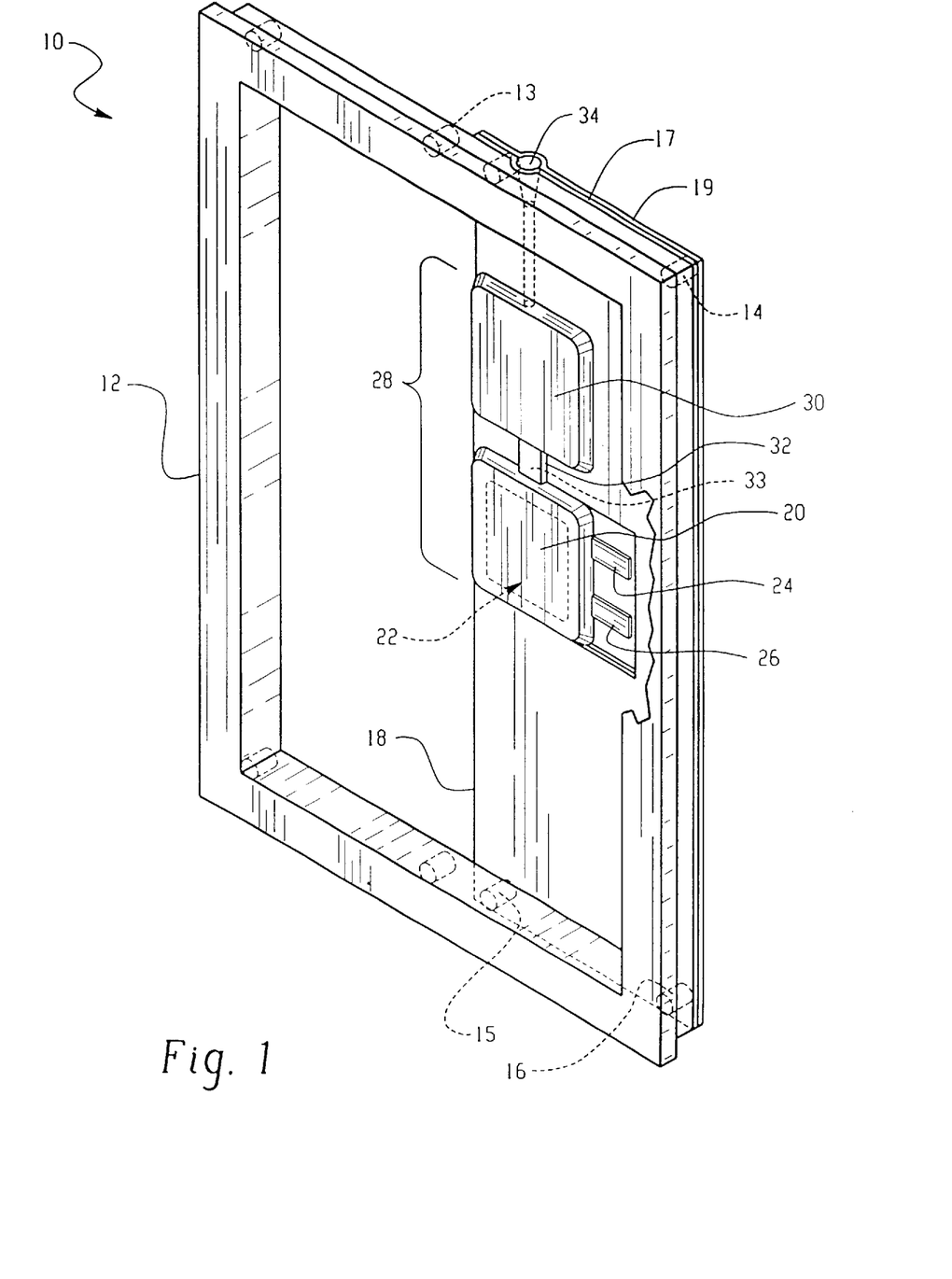
FIG. 1 is a perspective view illustration of the manner in which components of a flexible battery can be mounted when supported by the apparatus of the present invention, according to one embodiment of the invention herein.

FIG. 1 illustrates a perspective view of the manner in which components of a flexible battery can be mounted when supported by the apparatus of the present invention. Mounting assembly 10 has laminate sheet members 17 and 19 fixed in place by top pins 13 and 14 and bottom pins 15 and 16 of support pallet 12. Laminate sheets 17 and 19 form opposing walls of flexible battery enclosure 28. The opposing walls of battery enclosure 28 are joined along a portion of the perimeter of enclosure 28 and define electrode pouch 20, gas pouch 30 and connecting channel 32 that connects the two pouches. Electrode pouch 20 contains electrode assembly 22 having an anode tab 24 and a cathode tab 26 protruding from the interior to the exterior of battery enclosure 28 along the vertical plane, or nearly vertical plane, at which the opposing walls are joined. Gas pouch 30 is empty and serves as a reservoir for collecting any gas that may be generated during aging, storage, pre-discharge, formation cycling, shipping, handling or combinations thereof, of the battery after the electrolyte is introduced and the battery is sealed. Opposing walls 17 and 19 of battery enclosure 28 are not joined at a location defining a fill opening 33 and gas pouch opening 34. Both the gas pouch opening and the fill opening provide access for the addition of electrolyte into electrode pouch 20. Fill opening 33 and gas pouch opening 34 are unsealed when electrolyte is dispensed into the electrode pouch, and thereafter, sealed to form a fluid-tight seal.

Mounting assembly 10 is produced by first securing, in place, laminate sheet 19 on upper pins 13 and 14 and lower pins 15 and 16 of pallet 12 which frames an open area. The laminate sheet can then be formed, for example, via cold forming or vacuum drawing, to produce the recessed pouches (electrode pouch 20 and gas pouch 30), as well as connecting channel 32. Electrode pouch 20 can be recessed to conform to the general size and shape of electrode assembly 22 to be placed into the electrode pouch. Electrode assembly 22 is then placed into electrode pouch 20, and laminate sheet 19 is joined to laminate sheet 17 to form opposing walls of battery enclosure 28. Sheet forming to produce recessed pouches is not required. For example, the electrode assembly can alternatively be placed between two substantially flat laminate sheets which can be partially sealed to form an electrode pouch, and optionally, one or more gas pouches and connecting channels to provide fluid communication between the gas pouches and the electrode pouch. Several sizes, shapes and configurations of battery enclosures can be made by altering the pattern of sealing between the laminates.

Opposing walls of battery enclosure 28 can be created by using two separate laminate sheets, which may be the same or different, or by folding an extended portion of a single sheet over itself to cover the recessed pouches and connecting channel. For example, FIG. 1 shows laminate sheet 17 is an extended portion of laminate sheet 19, and the presence of folded edge 18 eliminates the need for sealing battery enclosure 28 along at least one of the edges. In such case, the assembly will yield a flexible battery that has a greater internal volume than a flexible battery that is produced by sealing the battery enclosure along the entire perimeter.

Opposing walls 17 and 19 of battery enclosure 28 are sealed generally along the perimeter of the electrode pouch, the gas pouch and the connecting channel with a portion of the opposing walls being unsealed, for example, at fill opening 33 and gas pouch opening 34, so that liquid electrolyte can be dispensed into the electrode pouch. Preferably, where electrode tabs 24 and 26 extend from the interior of the battery enclosure to the exterior of the battery enclosure, they are positioned such that they do not extend through either the fill opening 33 or the gas pouch opening 34. Therefore, the seal that accommodates such tabs is completed prior to the introduction of electrolyte into the electrode pouch. This procedure aids in providing for a leakproof battery since the seal surrounding the tabs is particularly prone to leakage.

The laminate sheet can be a multi-laminate sheet which has a metallic foil layer sandwiched between a sealable inner layer and an external protective layer. In such case the battery enclosure is formed so that the sealable layer of laminate sheet 17 faces the sealable layer of laminate sheet 19. For example, the sealable layers of the laminate sheets can be heat-sealable polymers such as polyethylene or polypropylene that melt when heat and pressure is applied and bond upon cooling. Alternate methods of sealing as are known in the art include ultrasonic welding and high frequency welding.

Laminates which are constructed of a metal foil surrounded by a protective polymer on one side and a heat-sealable polyethylene or polypropylene on the opposite side are commonly available. Such laminates and can be obtained from, for example, Pharma Center Shelbyville, Inc. of Shelbyville, Ky. under the product designation 97031, Dai Nippon printing Co., Ltd. of Tokyo, Japan under the product designation D-EL40E, and also, Sumitomo Electric Industries, Ltd. of Tokyo, Japan under the product designation L-NY-A1-TRPP-L. A laminate with an ethylene acrylic acid (EAA) heat-sealable layer is available from Pharma Center Shelbyville, Inc., product designation 95014. Alternatively, a laminate with an ethylene methacrylic or polyethylene methacrylic acid heat-sealable layer is made by Ludlow Coated Products of Homer, La. The appropriate laminate and sealing layer will be selected on the basis of, among other factors, the type of electrolyte to be used, as is known in the art. The impervious metallic foil can be any variety of metals such as, for example, aluminum, nickel, copper and stainless steel.

Figure 2:
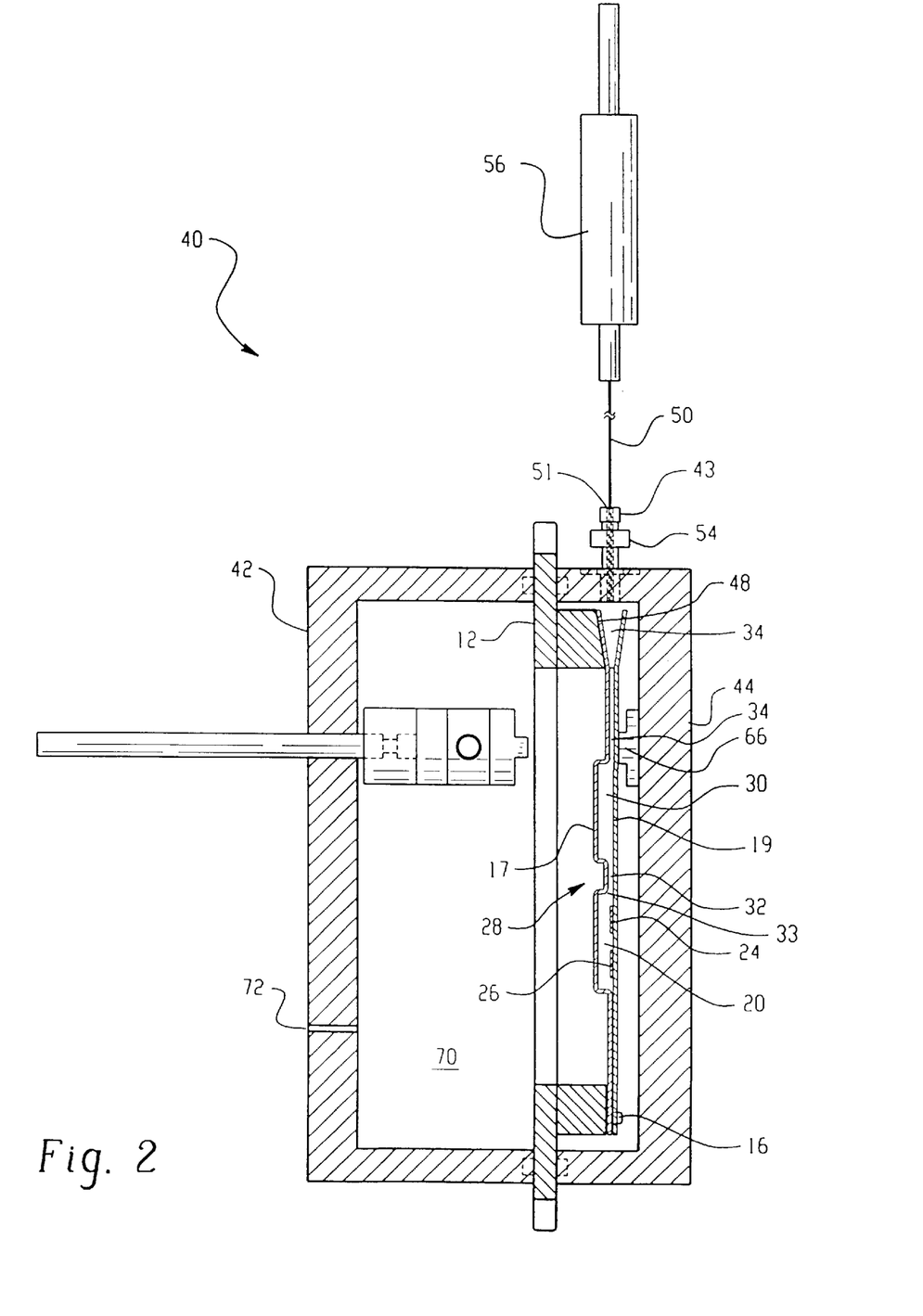
FIG. 2 is a side view schematic illustration, partly in cross section, of the apparatus for assembling a flexible battery according to one embodiment of the invention herein.

In one embodiment of the present invention, the apparatus for assembling a flexible battery can be described with reference to FIG. 2. FIG. 2 illustrates a side view, partly in cross-section, of apparatus 40 for assembling a flexible battery. Apparatus 40 comprises support body 70 adapted to support a battery enclosure, and dispensing element 50 for dispensing electrolyte into battery enclosure 28. A side view of battery enclosure 28 is shown in FIG. 2 with pallet 12 disposed between front tool 42 and rear tool 44 of support body 70. Support body 70 can be adapted to support a battery enclosure via any suitable support assembly, such as is shown with pallet 12, or alternatively, support body 70 can be adapted in a way such that battery enclosure 28 is supported directly by support body 70.

As shown in FIG. 2, battery enclosure 28 has opposing walls, made from laminates 17 and 19, which have been positioned in the apparatus in a vertical, or nearly vertical, plane. A portion of the opposing walls remain unsealed at gas pouch opening 34, fill opening 33, and connecting channel 32 which runs between the gas pouch and the electrode pouch. The battery enclosure is supported such that electrode pouch 20 is positioned vertically below gas pouch 30 and connecting channel 32, and fill opening 33 is located in the upper portion of electrode pouch 20 at or near the base of connecting channel 32. Thus, when electrolyte is dispensed into electrode pouch 20 during assembly, the electrolyte is subjected to the forces of gravity causing it to flow towards the lowest portion of the battery enclosure and through the electrode assembly. Preferably, the support body supports the battery enclosure such that the surface area of any unbounded free electrolyte, i.e., the unabsorbed electrolyte that is not in contact with the surfaces of the enclosure, is minimized. Such an arrangement reduces the potential for free electrolyte to spill or splash onto the unsealed surfaces surrounding openings 32, 33 and 34.

Most or all of the electrolyte that is dispensed into the electrode pouch is absorbed by the electrode assembly. High electrolyte dispensing rates can exceed the absorption rate of the separator and electrode material in the electrode assembly and free electrolyte can accumulate in the electrode pouch. A free electrolyte fill level can be predetermined based on the dispensing rate and the size, structure and composition of the flexible battery that is to be assembled. Thus, support body 70 of apparatus 40 of the present invention supports the battery enclosure with fill opening 33 located in the upper portion of electrode pouch 20 and above the predetermined fill level of free electrolyte that may accumulate in the electrode pouch.

The support body supports the battery enclosure such that the internal volume of electrode pouch below the fill opening is greater than the internal volume of the electrode pouch above the fill opening. Preferably, the volume of the electrode pouch below the fill opening is at least 75% of the total inside volume of the electrode pouch, and even more preferably, the fill opening is located along the uppermost surface of the electrode pouch and positioned vertically above the electrode assembly.

Apparatus 40 of the invention herein, also comprises dispensing element 50 having discharge orifice 51. Dispensing element 50 is movable between a retracted position and a fill position. FIG. 2 shows dispensing element 50 in a retracted position located vertically above stationary fitting 43 that connects to mounting plate 54 on rear tool 44 of support body 70. Dispensing element 50 is sized and shaped such that it can be inserted between laminates 17 and 19 that form opposing walls of battery enclosure 28. For example, the dispensing element can comprise a hollow tube such as a hypodermic needle which is long and narrow and can be inserted through the openings 32, 33 and 34. Pallet 12 has a tapered wall adjacent to gas pouch opening 34 to guide dispensing element 50 between the unsealed opposing walls forming gas pouch opening 34. Preferably, gas pouch opening 34 is formed with a tapered shape as shown in FIG. 2 conforming to the tapered wall of pallet 12, to aid in guiding the dispensing element 50 into the battery enclosure 28. When the dispensing element is moved from a retracted position to a fill position, the dispensing element is movable toward the fill opening of the electrode pouch. Discharge orifice 51 is located vertically above battery enclosure 28 when the dispensing element is in a retracted position, and can be moved downward through gas pouch opening 34 and through connecting channel 32 to fill opening 33 of the electrode pouch.

In another embodiment of the present invention, the apparatus for making a flexible battery also provides for a means to control its interacting and movable components. The electrolyte from an electrolyte source (not shown) can be gravity fed through dispensing element 50. Alternatively, a pressure source, for example, pump 56 can be used to provide constant pressure on the electrolyte. In another embodiment, the apparatus further comprises a control system that is operably connected to the electrolyte source or the pressure source, or both, and regulates the amount of electrolyte that is discharged into the electrode pouch.

Figure 3:
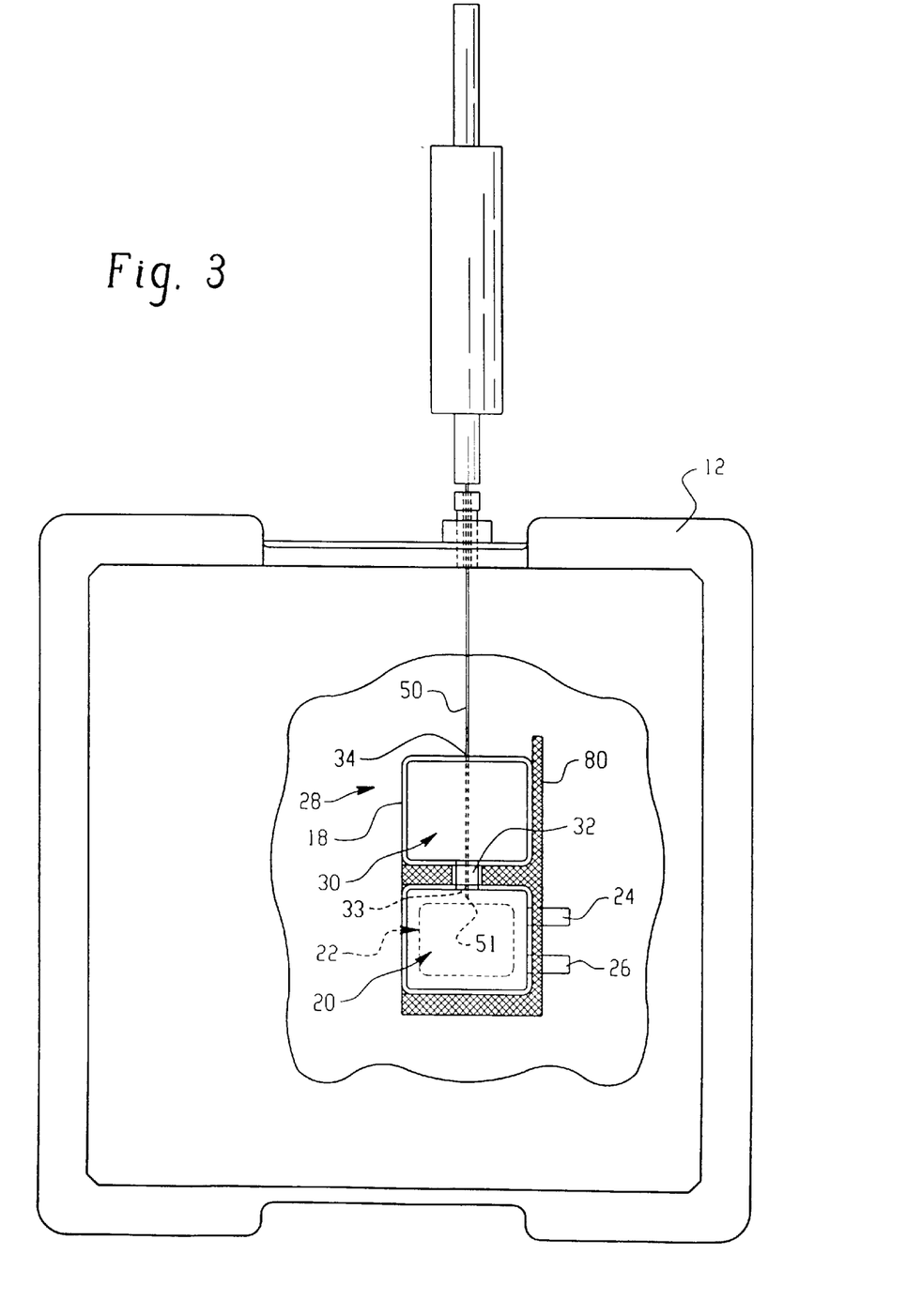
FIG. 3 is a front view, cross-section illustration of the apparatus of FIG. 2 showing the dispensing element in the fill position as electrolyte is added to the electrode pouch according to one embodiment of the invention herein.

FIG. 3 is a front view, cross-section illustration of apparatus 40 of FIG. 2 and shows dispensing element 50 and discharge orifice 51 inserted into battery enclosure 28 in the fill position. The perimeter of battery enclosure 28 is closed along folded edge 18 and sealed wall surfaces 80 and is open at gas pouch opening 34. When dispensing element 50 is in the fill position, discharge orifice 51 is located at or below fill opening 33. The discharge orifice directs the flow of electrolyte into electrode pouch 20 and away from the sealing surfaces of the battery enclosure that surround electrode pouch fill opening 33 and are subsequently sealed. By directing the flow of electrolyte away from the unsealed portion of the battery enclosure, it is meant that the flow of electrolyte can be dispensed at any angle so long as the flow of electrolyte is overcome by the force of gravity or some external force that prevents the flow of electrolyte from reaching the portion of the unsealed wall surfaces that surround the fill opening and which are later sealed. In FIG. 3 discharge orifice 51 is at the end tip of dispensing element 50 and is located inside electrode pouch 20. The flow of electrolyte is directed in a downward direction.

The shape of the discharge orifice can control the manner in which the electrolyte flows into the electrode pouch. For example, the discharge orifice can be shaped to cause a spray or a stream and also to control the direction of the flow. The discharge orifice is shaped, positioned or oriented such that the flow of electrolyte is away from the unsealed surfaces which are subsequently sealed.

Figure 4:
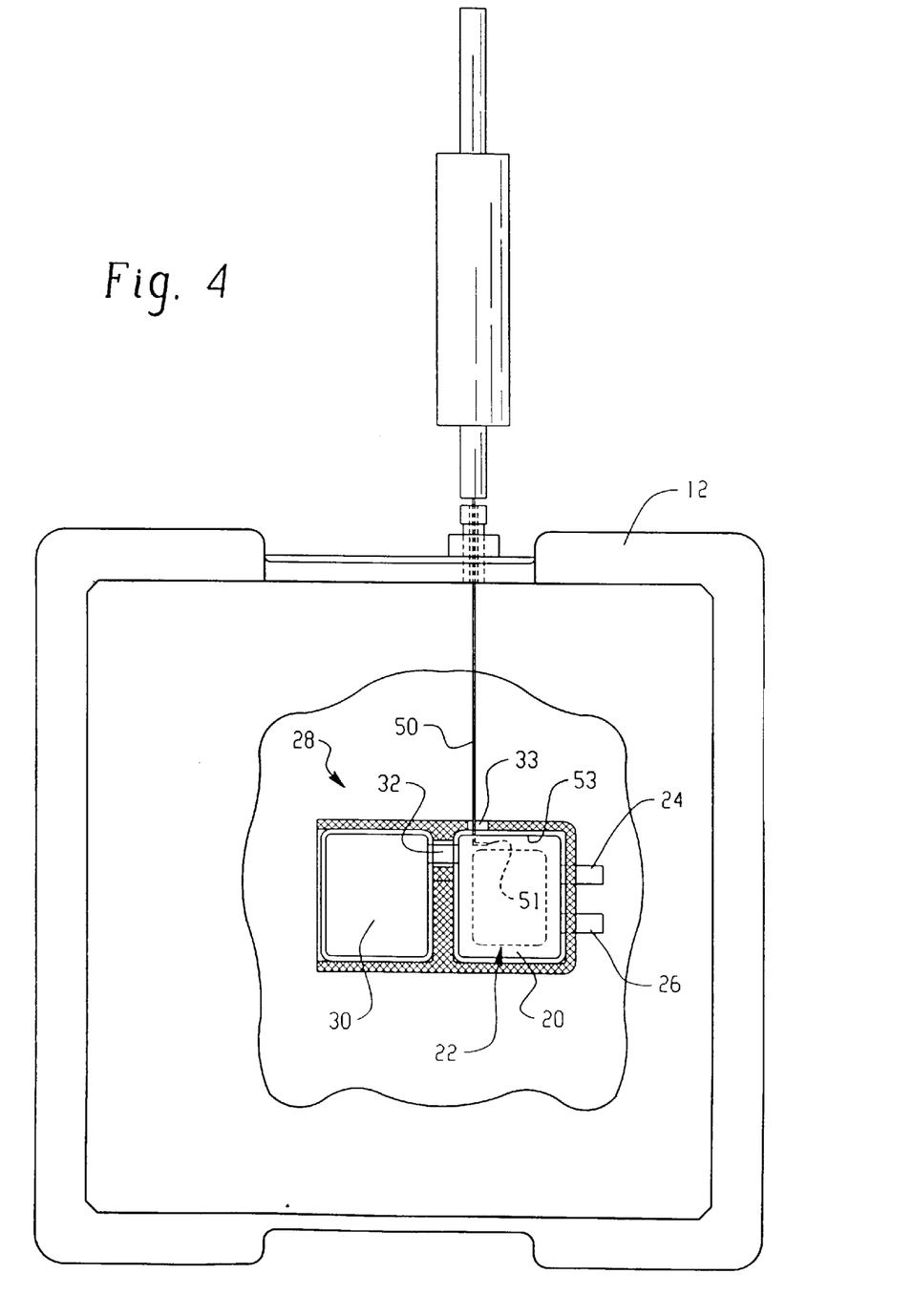
FIG. 4 is a cross-section illustration of the apparatus of the present invention showing the dispensing element in the fill position as electrolyte is added to an electrode pouch according to another embodiment of the invention herein.

Apparatus 40 supports battery enclosure 28 such that fill opening 33 is located at the base of connecting channel 32 and is vertically in-line with gas pouch opening 34. This alignment of the openings allows for direct and easy access of the dispensing element to the electrode pouch. Alignment of the openings, however, is not necessary to carry out the invention. FIG. 4 shows apparatus 40 which supports battery enclosure 28 having fill opening 33 and the connecting channel 32 in separate locations of electrode pouch 20. Dispensing element 50 does not pass through connecting channel 32 during the electrolyte fill process. The connecting channel and the fill opening create two distinct openings in the electrode pouch. In such case, apparatus 40 of the present invention is adapted to support the battery enclosure such that both the connecting channel and the fill opening are positioned to avoid contact between electrolyte and the unsealed surfaces that are to be sealed, and to avoid the flow of any free electrolyte into the gas pouch 30. The discharge orifice of the dispensing element, when in the fill position, directs the flow of electrolyte away from the unsealed or open surfaces of the electrode pouch that surround the fill opening and the connecting channel. In yet another embodiment (not shown), fill opening 33 and connecting channel 32 are again located in separate locations of electrode pouch 20 such that dispensing element 50 does not pass through connecting channel 32, and there is an opening in the electrode pouch for the introduction of electrolyte that is distinct from an opening allowing for the passage of gas between the electrode pouch and the gas pouch. In this embodiment, however, connecting channel 32 runs parallel with the movement direction of dispensing element 50. In either case, the connecting channel and the fill opening are located above a predetermined electrolyte fill level to avoid contact between electrolyte and the unsealed surfaces that are to be sealed, and to avoid the flow of free electrolyte into the gas pouch 30.

The discharge orifice 51 of the dispensing element as shown in FIG. 4 can direct the flow of electrolyte in an upward, horizontal, or downward direction so long as the flow of electrolyte is overcome by the force of gravity or an external force that prevents the flow of electrolyte from reaching the unsealed surfaces and also prevents the introduction of free electrolyte into the gas pouch 30. For example, the flow of electrolyte can be directed in an upward direction toward a sealed portion 53 of electrode pouch 20. In such case, the flow of electrolyte is directed toward the closed walls of the battery enclosure, and upon contact, is redirected in a downward position.

In another embodiment of the invention, the discharge orifice, when the dispensing element is in the fill position, can be positioned above the predetermined fill level of electrolyte in the electrode pouch in order to avoid contact with the electrolyte that accumulates in electrode pouch during filling. This ensures that the exterior surface of the dispensing element does not contaminate the unsealed surfaces of the battery enclosure during movement of the dispensing element between the fill position and the retracted position. Also, since the electrode assembly within the electrode pouch absorbs the electrolyte that is dispensed, the dispensing element can be positioned or shaped to avoid contact with the electrode assembly when in the fill position.

The dispensing element of the apparatus herein can be sized and shaped to move from the retracted position to the fill position without contacting the portions of opposing walls that define the gas pouch opening and the fill opening in the electrode pouch. This helps assure that any residual electrolyte that is on the surface of the dispensing element does not touch the portion of the opposing walls that are subsequently sealed to produce an electrolyte-tight, or fluid-tight flexible battery. Further, the dispensing element can incorporate a suction feature that removes any remaining electrolyte at or around the discharge orifice 51 prior to initiating withdrawal of the dispensing element. This suction feature aids in avoiding contamination of unsealed sealing surfaces during withdrawal of the dispensing element through openings 32, 33 and 34 to its retracted position after electrolyte filling has been completed.

In another embodiment of the present invention, support body 70 of apparatus 40 shown in FIG. 2 is also a vacuum chamber that imparts reduced pressure, i.e. less than one atmosphere, or 760 Torr, on battery enclosure 28 as electrode pouch 20 is filled with electrolyte. Vacuum port 72 provides fluid communication with a vacuum source (not shown). The reduction of pressure in the vacuum chamber can improve, i.e. increase, the fill rate of electrolyte dispensed into the electrode pouch. The resulting evacuation of air inside the electrode assembly 22 enables electrolyte to quickly fill the pores of the electrode assembly.

Figure 5:
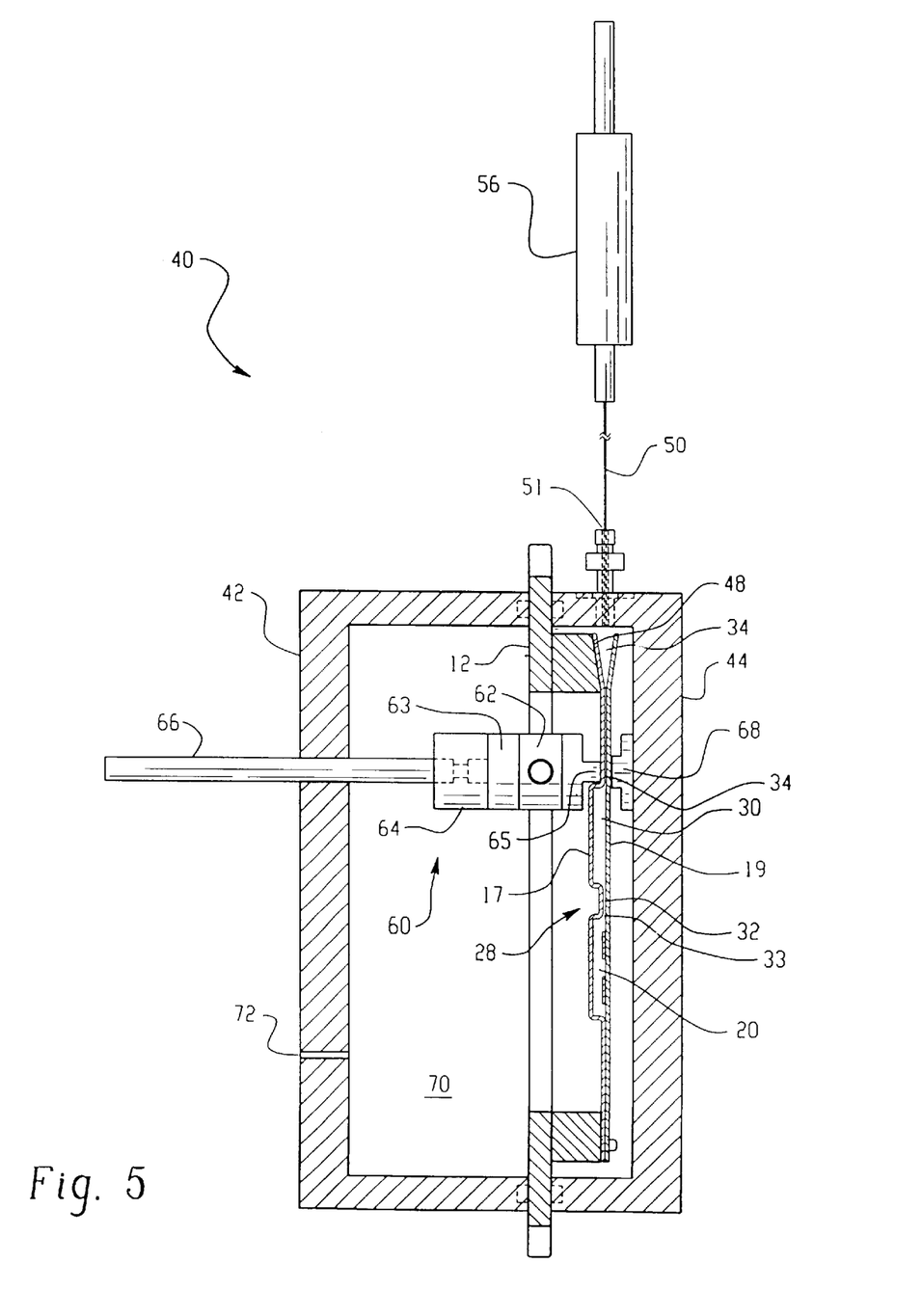
FIG. 5 is a side view schematic illustration of the apparatus of FIG. 2 illustrating the heat seal assembly engaged in the seal position while sealing the battery enclosure according to another embodiment of the invention herein.

In another embodiment of the present invention, apparatus 40 further comprises a heat-seal assembly that seals the battery enclosure 28 at the gas pouch opening 34 after the electrolyte is dispensed and the electrolyte dispensing element has been retracted. Fill opening 33 and connecting channel 32 remain open. Apparatus 40 illustrated in FIG. 5 shows heat seal assembly 60 which comprises heater plate 62, heat dam 63, chill plate 64, seal tool 65 and shaft 68. Heater plate 62, heat dam 63, and chill plate 64 operate together to control the temperature of seal tool 65. Heat seal assembly 60 is movable along shaft 66. FIG. 5 shows heat seal assembly 60 engaged in a sealing position. Seal tool 65 is arranged horizontally in-line with backing plate 68. When the heat seal assembly is engaged in a sealing position, the walls of the battery enclosure that define gas pouch opening 34 are squeezed between the seal tool and the backing plate. The application of heat and pressure between the seal tool and the opposing walls causes the sealable layers of the opposing walls to soften and bond to one another. Seal tool 65 can be sized to produce the desired seal dimensions of the battery enclosure.

Figure 6:
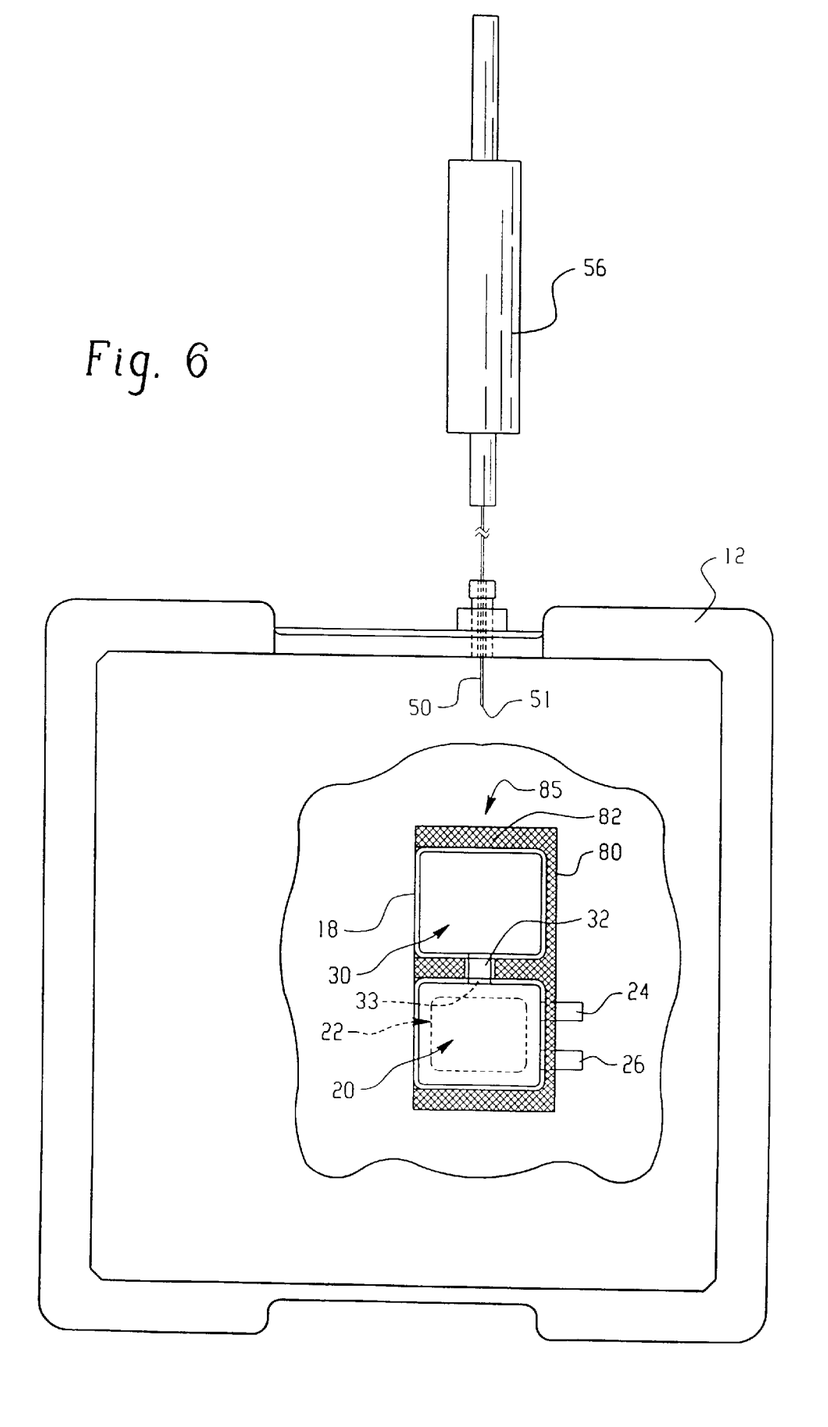
FIG. 6 is a front view, cross-section illustration of the flexible battery assembly apparatus illustrating the sealed surfaces of the sealed battery enclosure according to another embodiment of the invention herein.
Figure 7:
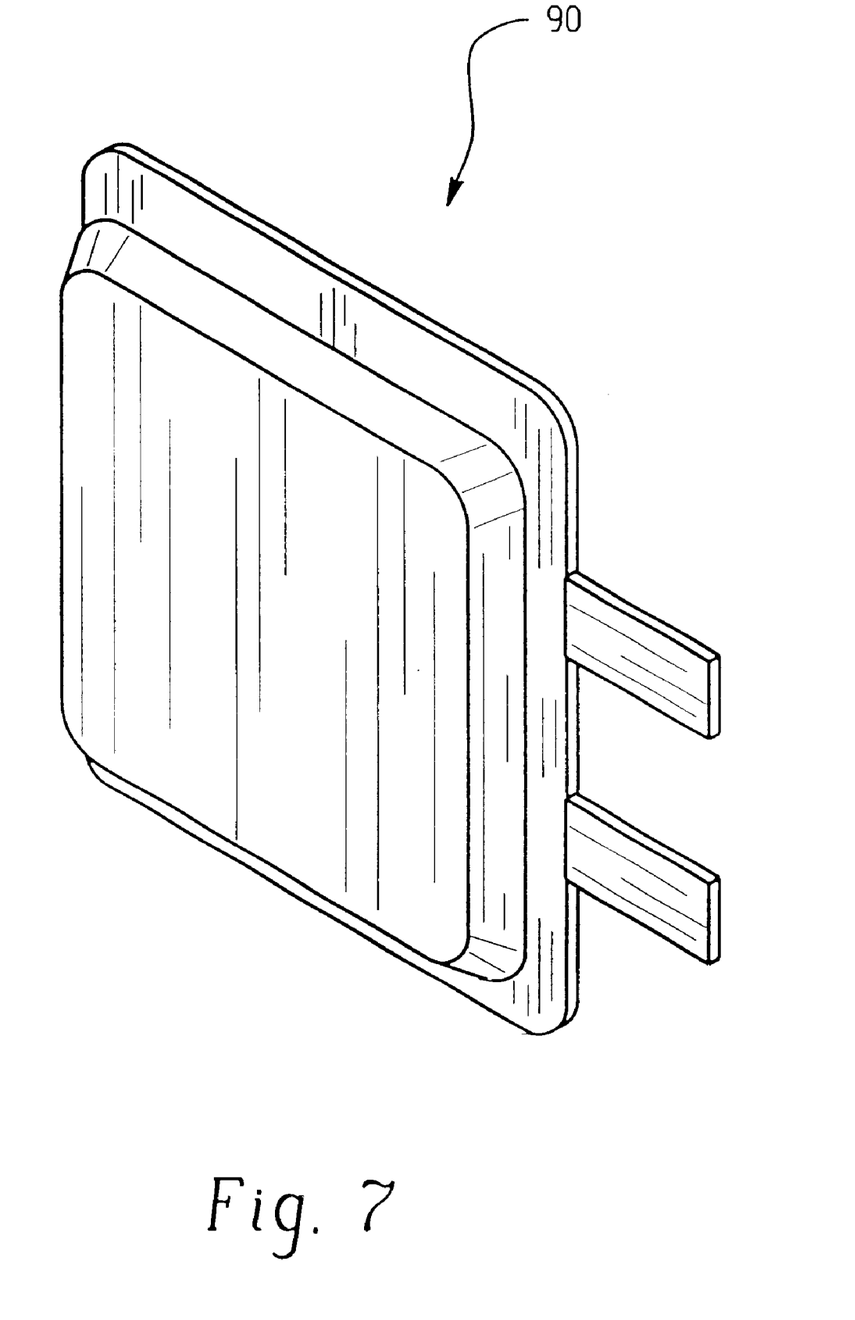
FIG. 7 is a perspective view of the resulting electrolyte-tight flexible battery according to the invention herein.

FIG. 6 is a front view, cross-section illustration of apparatus 40 supporting sealed battery assembly 85. The portion of the battery enclosure that once defined the gas pouch opening is shown sealed at 82 along sealed surface 80. The sealed battery assembly is completely sealed along its perimeter while the connecting channel 32 between electrode pouch 20 and gas pouch 30 remains open. The gases generated during aging, storage, pre-discharge, formation cycling, shipping, handling or combinations thereof, can freely flow through connecting channel 32 and accumulate in gas pouch 30. These accumulated gases can be removed from the gas pouch by making an opening in the gas pouch. Alternatively, the gas pouch 30 can be separated, or cut away, from electrode pouch 20 after sealing the opening between the gas pouch 30 and the electrode pouch 20. The result is flexible battery 90 illustrated in FIG. 7.

The method of assembling a flexible battery from a battery enclosure containing an electrode assembly and a fill opening, comprises arranging the battery enclosure so that the fill opening is oriented in an upper portion of the battery enclosure and dispensing electrolyte into the electrode pouch. The opening of the electrode pouch is above the predetermined free electrolyte fill level. The electrolyte is dispensed inside the electrode pouch in a direction that is away from the fill opening. The electrolyte can be dispensed in any direction so long as the flow of electrolyte is overcome by the force of gravity or a counter-force that prevents the flow of electrolyte from reaching the sealing surfaces of the electrode pouch fill opening.

In another embodiment of the present invention, the method for filling a flexible battery enclosure having an electrode pouch and a gas pouch, and a connecting channel between the two pouches, comprises arranging the battery enclosure so that the fill opening of the electrode pouch and the connecting channel are both in an upper portion of the electrode pouch, and then, dispensing the electrolyte into the electrode pouch.

In another embodiment of the invention, the battery enclosure is supported within a vacuum chamber and a vacuum is pulled within the chamber prior to the introduction of electrolyte into the battery enclosure.

According to another embodiment of the present invention, the method for assembling a pouch battery further comprises moving the dispensing element out of the battery enclosure and sealing the opposing walls that define the gas pouch opening 34. When the opposing walls are made from one of many multi-layer laminates having a heat-sealable layer, the portion of the opposing walls surrounding gas pouch opening can be bonded together by applying heat or the combination of heat and pressure. The surface temperature of seal tool plate 65 shown contacting opposing wall 17 in FIG. 5 ranges from about 160° C. to about 190° C. and preferably a maximum of 180° C. Opposing walls 17 and 19 are placed into contact. The pressure exerted on opposing walls 17 and 19 between tool plate 65 and backing plate 68 ranges from about 50 psi to about 3000 psi and is preferably about 300 to about 1500 psi. The hold time for bonding the heat-sealable layers of the opposing walls can range from about 0.5 seconds to about 5 seconds, and preferably, from about 1.5 to 3 seconds.

After the gas pouch opening is sealed, the resulting electrolyte-tight sealed battery assembly 85 of FIG. 6 can be charged and discharged to remove discharge gas as described above and fill opening 33 can be sealed. The gas pouch and connecting channel of the battery enclosure can be separated from the electrode pouch to produce the electrolyte-tight flexible battery shown in FIG. 7.

EXAMPLE

An electrode assembly was constructed consisting of a cathode, anode and separator. The cathode containing iron pyrite, conductor and binder was intermittently roll coated onto an aluminum foil. An aluminum contact tab was ultrasonically welded onto the mass free zone of the foil. The anode consisted of lithium foil with a cold welded nickel contact tab and the separator was a polypropylene film from Celgard, Inc. of Charlotte, N.C. known as Celgard 2400. The anode, cathode and separator were rolled into a prismatic jellyroll electrode assembly having the following approximate dimensions: 43.6 millimeters×40.0 millimeters×3.5 millimeters. The assembly was placed into an electrode pouch formed of a laminate having a thickness of about 115 microns and available from Dai Nippon Printing and designated D-EL40E. In those areas where the tabs would be subject to heat sealing, they were wrapped with acid degenerated polyethylene strips available from Dai Nippon Printing and designated PEa strips. The battery enclosure was then formed by folding the laminate sheet over the electrode pouch and heat sealing around the perimeter of the electrode pouch and the gas pouch, except for the gas pouch opening and the fill opening. The heat seal is performed at 180° C. and 316 psi pressure for 1.5 seconds. The internal volume of the electrode pouch was 6.07 cubic centimeters and the total void volume (less solids) was 1.82 cubic centimeters.

The mounting assembly was placed vertically into a vacuum chamber, positioning the opposing walls of the battery enclosure in a vertical orientation. A dispensing element was moved into the fill position and a vacuum of 300 Torr was pulled. 1.47 cubic centimeters of electrolyte containing 9.14 weight percent LiI, 63.05 weight percent 1,3 dioxolane, 27.63 weight percent 1,2 dimethoxyethane and 0.18 weight percent 3,5 dimethylisoxazole was dispensed into the battery compartment in 3 seconds, leaving a net void volume of 0.35 cubic centimeters. The net void volume is left to account for potential electrolyte expansion in the event of exposure to elevated temperatures during the life of the battery. The dispensing element was retracted and the gas pouch opening was sealed by applying 709 psi pressure and 180° C. for 1.5 seconds.

The sealed battery assembly was aged overnight. A final seal was established over the fill opening by applying 333 psi pressure and 180° C. for 1.5 seconds. The gas pouch was separated from the electrode pouch leaving a battery with final dimensions of 53 millimeters by 50.8 millimeters by 3.8 millimeters.

Although only a few embodiments of the present invention have been described above, it should be appreciated that many modifications can be made without departing from spirit and scope of the invention. For example, although the foregoing discussion relating to the apparatus and method of assembling a flexible battery has been made in connection with a battery enclosure having an electrode pouch, and a battery enclosure having an electrode pouch and a gas pouch, it should be appreciated that the invention herein is also applicable to the assembly of flexible batteries having more than two pouches. The specification is intended to include modifications and alterations insofar as they come within the scope of the appended claims or the equivalents thereof.

What is claimed is:

1. An assembly system for assembling a flexible battery comprising:
   a flexible battery precursor comprising a battery enclosure, the battery enclosure comprising an electrode pouch including a fill opening that is open when electrolyte is introduced into the electrode pouch and unsealed surfaces which are thereafter sealed; and
   an assembly apparatus, the assembly apparatus comprising:
   a support body adapted to support the battery enclosure with the fill opening located in an upper portion of the electrode pouch; and
   a dispensing element for introducing electrolyte into the battery enclosure, the dispensing element having a discharge orifice that directs the flow of electrolyte into the electrode pouch and away from the surfaces surrounding the fill opening;

wherein the dispensing element is retractable from the flexible battery precursor following electrolyte introduction.

2. The assembly system of claim 1 wherein the battery enclosure has opposing walls that are joined along at least a portion of the perimeter of the enclosure and wherein the support body supports the battery enclosure such that the joined walls are oriented vertically during the introduction of electrolyte into the electrode pouch.

3. The assembly system of claim 2 wherein the support body supports the battery enclosure such that the fill opening in the upper portion of the electrode pouch is located above a predetermined electrolyte fill level.

4. The assembly system of claim 3 wherein the apparatus further comprises a vacuum port and a vacuum chamber surrounding the battery enclosure that imparts reduced pressure within the chamber.

5. The assembly system of claim 2 wherein gravity causes the electrolyte to flow in a downward direction during the introduction of electrolyte into the electrode pouch.

6. The assembly system of claim 5 wherein the support body supports the battery enclosure such that the fill opening is located vertically above the electrode assembly.

7. The assembly system of claim 6 wherein the dispensing element moves vertically between a retracted position and a fill position, and the dispensing element is located vertically above the electrode assembly when the dispensing element is in the fill position.

8. The assembly system of claim 7 wherein the dispensing element is sized to move from the retracted position to the fill position without contacting the portion of the battery enclosure surrounding the fill opening.

9. The assembly system of claim 2 wherein the battery enclosure further comprises a gas pouch and a connecting channel between the gas pouch and the electrode pouch, and wherein the dispensing element extends through the gas pouch and the connecting channel when moving from the retracted position to the fill position.

10. The assembly system of claim 1 further comprising a seal assembly that closes the fill opening.

11. The assembly system of claim 1 further comprising:
a control system operably connected to the dispensing element or the electrode pouch, or both, and,
a programmable platform for imparting relative registration positioning of the dispensing element relative to the fill opening.

12. The assembly system of claim 1 further comprising:
an electrolyte source in fluid communication with the dispensing element;
a pressure source that exerts pressure on the electrolyte source and causes the electrolyte to flow to the dispensing element; and
a control system operably connected to the electrolyte source or the pressure source, or both, to regulate the amount of electrolyte that is discharged into the electrode pouch.

13. The assembly system of claim 1 further comprising a suction element to remove electrolyte from the discharge orifice of the dispensing element.

14. A method for assembling a flexible battery from a battery enclosure comprising an electrode pouch comprising an electrode assembly, unsealed surfaces that are thereafter sealed and an electrolyte fill opening, the method comprising:

arranging the battery enclosure so that the fill opening is in an upper portion of the battery enclosure, and introducing electrolyte into the electrode pouch through a retractable dispensing element, through the fill opening so that the electrolyte does not contact the unsealed surfaces that are thereafter sealed.

15. The method of claim 14 wherein the battery enclosure has opposing walls that are joined along at least a portion of the perimeter of the enclosure, said method further comprising supporting the battery enclosure such that the joined walls are oriented vertically during the introduction of electrolyte into the electrode pouch.

16. The method of claim 15, further comprising providing a vacuum chamber surrounding the battery enclosure and applying a vacuum within said chamber during the introduction of electrolyte.

17. The method of claim 15, further comprising forming the electrolyte fill opening from an opening in the joined perimeter of the enclosure between the opposing walls.

18. The method of claim 17 further comprising sealing the unsealed surfaces following the introduction of electrolyte into the electrode pouch.

19. The method of claim 18 further comprising providing an anode tab and a cathode tab extending from the interior of the electrode pouch to the exterior of the electrode pouch between the opposing walls at a location other than the fill opening.

20. The method of claim 18, further comprising providing a gas pouch in fluid communication with the electrode pouch.

* * * * *